Patented Nov. 28, 1950

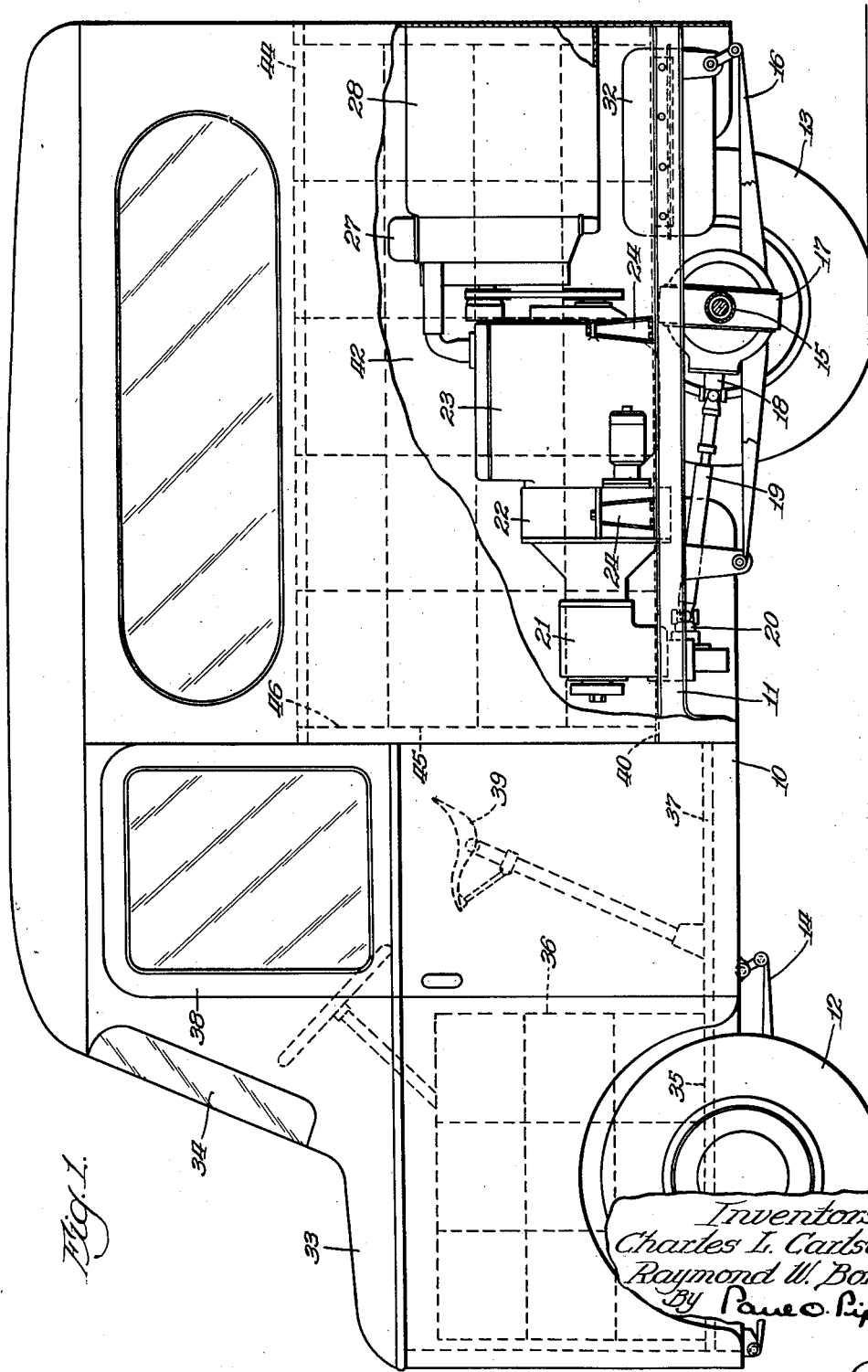

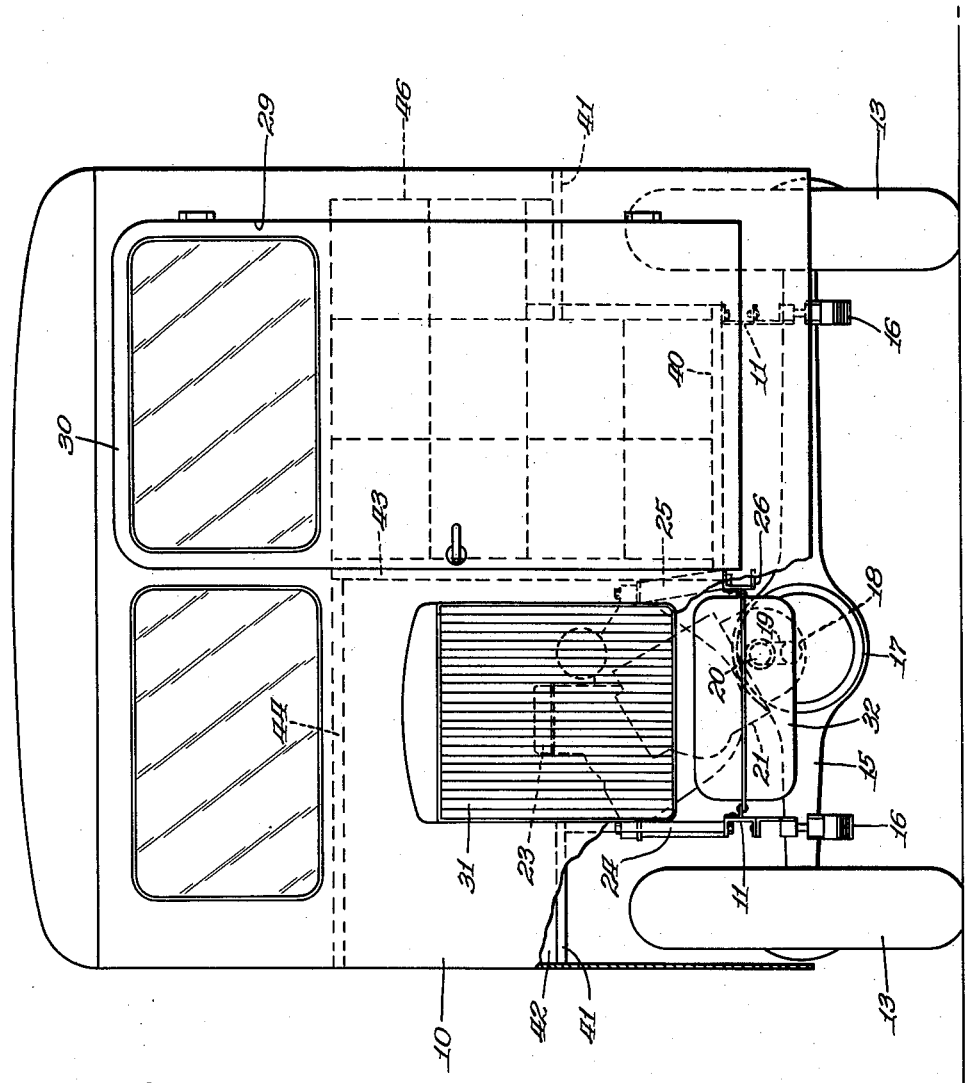

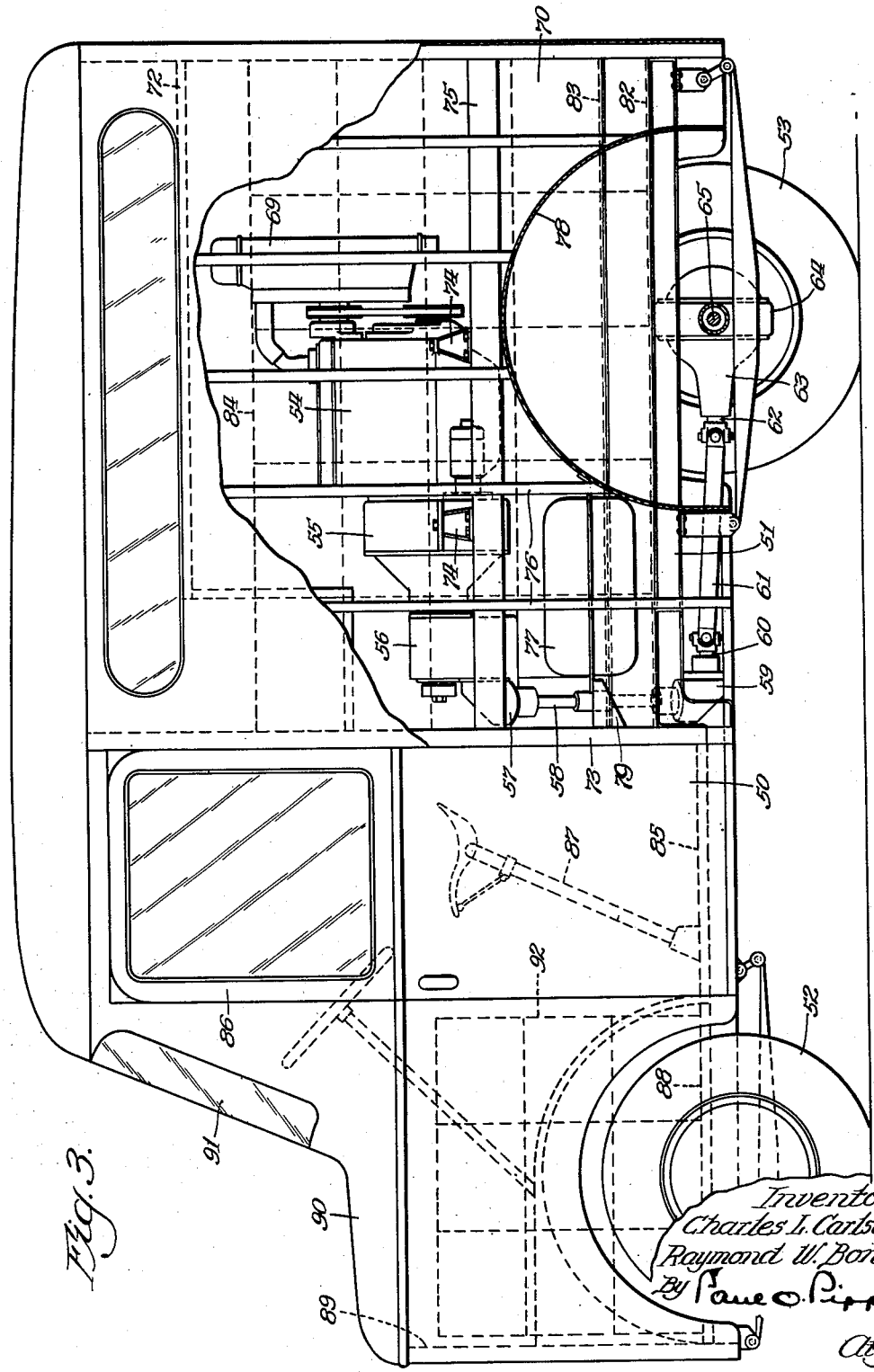

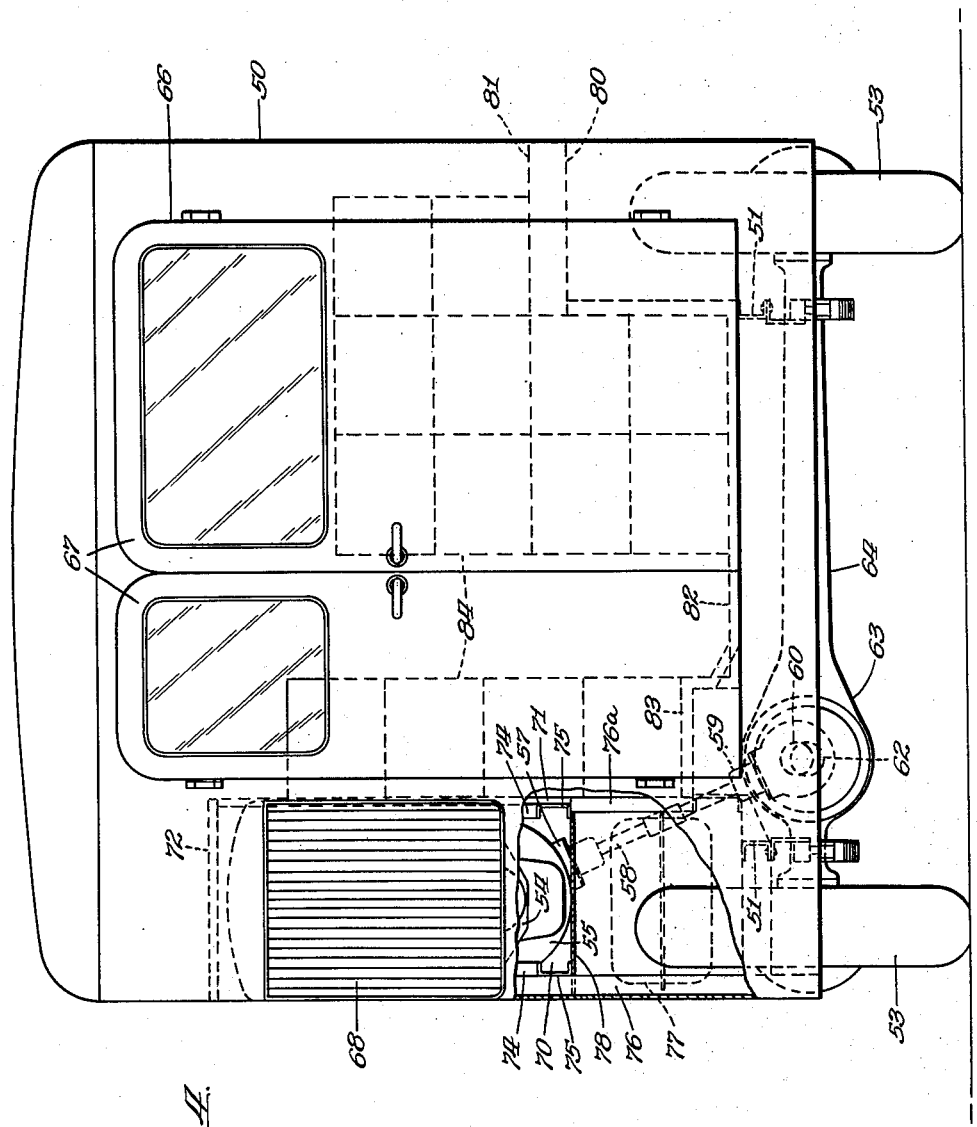

2,532,057

UNITED STATES PATENT OFFICE 2,532,057

PACKAGE DELIVERY TYPE MOTOR VEHICLE

Charles L. Carlson and Raymond W. Bond, Fort Wayne, Ind., assignors to International Harvester Company, a corporation of New Jersey Application July 12, 1947, Serial No. 760,646

3 Claims. (Cl. 180—89)

1

This invention relates to a motor vehicle and more particularly to a vehicle of the multi-stop or package-delivery type.

Vehicles of the type referred to have great utility in the delivery of packaged items on routes that include many stops and starts, as in the case of house-to-house delivery. It is a prime requisite in vehicles of this class that they be readily adapted to carry packaged articles, such as bread, milk, etc., while at the same time providing convenience for the driver in operating the vehicle and in mounting thereto and dismounting therefrom. Prior constructions of vehicles of this type have featured a driver's station having a depending or low platform arranged at a height only a single short step above the ground. The driver's station has heretofore, however, been impeded by a longitudinal housing which of necessity enclosed the longitudinal propeller shaft extending between the forward power plant and the rear driving wheels. The load-carrying floor of such vehicle was also disposed at a height consistent with the driving mechanism and axle housing located below it, with the result that the operator did not have free passage through the operator's station of the vehicle or to the load-carrying space.

It is an important object of the present invention to provide a vehicle of the class referred to above in which the driving mechanism is so arranged as to feature a low level unobstructed driver's station, together with a substantially constant level unobstructed load-carrying floor. It is an object of the invention to provide a power plant at the rear of the vehicle, preferably disposed at one side thereof so as to occupy as little as possible of the normal load-carrying space of the vehicle. It is another object of the invention to compensate for the apparent loss of pay-load space by the provision of additional pay-load space at the forward portion of the vehicle normally occupied by the power plant. Other objects of the invention are to provide: a compartment for housing the power plant at the rear of the vehicle; load-carrying space associated with the compartment; improved mounting for the power plant and drive mechanism; and an improved compact arrangement of the power plant, rear wheel housing and fuel tank.

The foregoing objects and other desirable features of the invention will become more apparent to those skilled in the art as the disclosure is more fully made in the following detailed description of two preferred embodiments of the invention as shown in the accompanying sheets of drawings, in which:

2

Figure 1 is a side elevation, with portions thereof broken away, of one type of multi-stop vehicle constructed according to the principles set forth above.

Figure 2 is a rear view of the vehicle shown in Figure 1.

Figures 3 and 4 are respectively a side elevation and rear view of a modified form of vehicle.

Figures 1 and 2

The vehicle chosen for the purposes of illustrating this form of the invention comprises a longitudinal body 10 provided with longitudinal frame structure including a pair of parallel frame members 11. The body 10 and frame structure 11 are carried on front wheels 12 and rear wheels 13. The front wheels are shown as being sprung to the body and frame by means of semi-elliptical springs 14 (only one of which is shown in Figure 1); although, any other type of suspension may be employed. The rear wheels 13 are carried at opposite ends of a transverse axle housing 15 connected to the frame members 11 at each side by semi-elliptical springs 16.

The axle housing 15 is provided with a laterally offset differential housing 17 which contains the usual differential gearing (not shown). This gearing is driven by a forwardly extending input shaft 18 connected by a universal joint to a short, forwardly and upwardly extending propeller shaft 19, the forward end of which is connected by a universal joint to a short driving shaft 20 projecting rearwardly from a change-speed transmission 21, the details of which are not shown inasmuch as they are not important to the disclosure of the present invention. The transmission housing 21 has a rearward extension in the form of a bell housing 22 which in turn is connected in the usual manner to one end of a power plant in the form of an internal combustion engine 23. This engine, as will be noted, occupies a position just the reverse of the normal position of an engine in a vehicle, so that the usual forward end of the engine in this case faces rearwardly. The engine is suitably carried at one side on supports 24 secured to the frame rails or members 11 and the engine is carried at its other side by similar supports 25 (Figure 2) in turn mounted on a longitudinally extending auxiliary frame rail 26. The engine includes a coolant-circulating system comprising a radiator 27, the core of which communicates with a generally rectangular shroud or housing 28 opening at the rear of the body 10.

The body may have very much the outline and general shape of the conventional vehicle, including opposite side walls, a top and a rear wall. The rear wall may include a loading opening 29 normally closed by a door 30 (Figure 2). The door is offset laterally to one side of the longitudinal centerline of the body, the power plant 23 being offset laterally to the other side of that centerline. In longitudinal alinement with the core of the radiator 27 and shroud or housing 28, the rear wall of the body includes a rectangular grille 31 covering the rear end of the housing 28, so that the engine fan may draw air through the grille and through the housing 28 to the radiator 27.

The left-hand frame rail 11 and auxiliary frame rail 26 suspend therebetween a fuel tank 32, which tank is located substantially directly below the housing 28 between the grille 31 and radiator 27. The fuel tank may be connected in the usual manner with the fuel supply system (not shown) of the engine 23.

The forward portion of the body 10 includes an enclosed load-carrying space designated generally by the numeral 33, the enclosing structure for which simulates the usual hood structure of a conventional vehicle. This structure fairs upwardly into a windshield assembly 34 which is in turn connected to the top of the body. The load-carrying space 33 includes a flat level floor 35, which is capable of carrying a substantial load, a representative load of milk cases being indicated in dotted lines by the numeral 36. The floor 35 extends rearwardly, is common to, and provides a flat floor portion 37 within an operator's station. The floor 37 extends transversely across the vehicle body and is unobstructed by driving mechanism passing longitudinally therethrough, as is the case in vehicles of earlier design. The transverse aisle or passageway through the operator's station may be closed at either side by a door 38. The numeral 39 designates a conventional type of seat construction within the operator's station, which seat may or may not be arranged for forward folding, as desired, whereby the driver may operate the vehicle while he is standing.

The portion of the vehicle rearwardly of the operator's station includes a longitudinally extending flat floor 40, interrupted in its expanse by the power plant 23 and associated housings 21 and 22, and rear wheel housings 41. The power plant 23, together with associated housings 21 and 22, is enclosed in a compartment 42 which includes a longitudinal side wall 43, a top wall 44, and a front wall 45, the front wall separating the engine compartment and the operator's station. The rear wall of the compartment is, of course, closed by that portion of the rear wall of the body that includes the grille 31. The right-hand wheel housing 41 is provided with a level top for the purpose of increasing the load-carrying capacity of the vehicle, a representative load of milk cases being indicated by the numeral 46. The wall 43 of the engine compartment 42 is preferably insulated. The top wall 44 of the compartment 42 may likewise be insulated and utilized as additional load-carrying space.

The design and construction of the vehicle shown in these figures are such that the load-carrying capacity thereof is equal to or greater than prior vehicles of corresponding size. The disposition of the power plant to the rear and laterally at one side of the vehicle eliminates the usual propeller shaft housing that heretofore formed an obstacle in the passageway through the driver's station. The disposition of the engine at the left side of the vehicle does not interfere materially with the balance of the vehicle, since it is the left side of the vehicle that travels ordinarily on the crown of the road. The arrangement of the fuel tank is such as to add to the compactness of the general arrangement and design of the rear-mounted power plant and driving mechanism.

*Figures 3 and 4*

The vehicle shown as representative of this form of the invention is very similar to that previously described and illustrated. In this case the vehicle includes a body 50 having parallel transversely spaced longitudinal frame rails 51, the forward portion of the body being carried on wheels 52 and the rear portion of the body being carried on rear wheels 53. In this form of the invention a power plant 54, in the form of an internal combustion engine, is disposed at the left side of a rear portion of the vehicle substantially above the left-hand rear wheel. The engine 54 includes a bell housing 55 which is in turn connected to a transmission housing 56. The housing 56 may include the usual transmission gearing (not shown) connected by means of gearing (also not shown) in an auxiliary housing 57 to a downwardly and laterally inwardly inclining drive shaft 58. The lower end of the shaft extends into a second auxiliary gear housing 59. This housing contains gearing (not shown) by means of which the shaft 58 is connected to a rearwardly extending drive shaft 60. The shaft 60 is connected by a universal joint to a short rearwardly extending propeller shaft 61, the rear end of which is connected by a universal joint to the forwardly projecting end of an input shaft 62 carried in a differential housing 63 of a rear axle housing structure 64. The differential housing 63 may contain the usual differential gearing for driving opposed axles, only one of which is shown at 65 in Figure 3, for the rear wheels 53.

The body 50, like the body 10 in Figure 1, approximates in appearance the conventional vehicle body. The rear wall of this body includes a load-carrying opening 66 normally closed by a pair of doors 67. That portion of the rear wall in longitudinal alinement with the power plant 54 is provided with an opening covered by a grille 68. The grille is in longitudinal alinement with a radiator 69 forming part of the coolant-circulating system of the engine 54. In this case there is no air inlet housing as such between the grille 68 and radiator 69, ample intake of air to the radiator being provided by means of the enclosing of the engine and its associated bell and transmission housings in a compartment 70, which includes the left-hand side wall of the vehicle body, the left-hand portion of the rear wall of the body, an inner vertical wall 71, a top wall 72, and a front wall 73. The engine is carried in this compartment by means of suitable supports 74 connected at each side thereof and mounted on a pair of parallel transversely spaced longitudinal rails 75, the outer or left-hand one of which is suitably connected to vertical supports or braces 76 of the body, and the inner of which is carried by short vertical members 76ª (Figure 4). A fuel tank 77 is disposed within the compartment 76 at a point ahead of the left-hand rear wheel 53 and below the housings 55 and 56 of the engine 54. The left-hand rear wheel is covered on its top by a semi-circular wheel housing 78, and the fuel tank 77 is supported in part by the housing 78 and in part by a bracket 79 connected to the front wall 73 of the engine compartment 70.

The right-hand rear wheel 53 is partly enclosed in a wheel housing 80, the upper portion of which is provided as a level area 81 which serves to increase the load-carrying capacity of the body 50. The rear portion of the vehicle includes a substantially level floor 82 extending between the wheel housing 80 at the right side of the vehicle to a stepped-up floor portion 83 adjacent the wall 71 at the left side of the vehicle. The stepped-up portion 83 is likewise adapted to carry a portion of the vehicle load, representative portions of the load being indicated in dotted lines as representing milk cases 84. The disposition of the load is such as to provide a narrow aisle between the right- and left-hand portions thereof. The load-carrying capacity of the rear portion of the vehicle may be further increased by carrying articles on the flat top wall 72 of the engine compartment 70, this wall and the wall 71 preferably being insulated.

Just ahead of the wall 73 of the engine compartment 70, the vehicle is provided with an operator's station having a low level floor 85. This floor, like the floor portion 37 of the vehicle shown in Figure 1, is only a single short step above the ground and enables the vehicle to be constructed without the usual running-board or dropped platform. The floor is unobstructed transversely of the vehicle by the conventional propeller shaft housing, whereby the operator may have passage through the vehicle and may enter and depart from either side thereof, each opposed side of the operator's station including a door 86. The operator's station may further include a seat 87 which may be of the forwardly folding type so that the operator may operate the vehicle while he is standing on the floor.

The floor 85 extends forwardly to provide a load-carrying floor 88 in a front load-carrying space or compartment 89. This compartment includes enclosing structure which simulates the usual radiator and hood structure of a conventional vehicle and which is associated in the usual manner with a windshield assembly joined at its top to the forward edge of the body top. A representative load of milk cases is shown in dotted lines at 92 in the front load-carrying space 89.

The fundamental characteristic features and advantages set forth in connection with the construction and design of the vehicle of Figures 1 and 2 are inherent also in the modification just described. Other advantages and features of the invention will undoubtedly occur to those skilled in the art.

It is not desired that the invention be limited to the exact details of construction shown and described.

What is claimed is:

1. A motor vehicle comprising a longitudinal body carried on front and rear wheels, said body having a floor structure, roof element, side walls, forward wall structure and rear wall; said floor structure being divided generally transversely thereof into an operator's station and a rearwardly located space extending from said operator's station to said rear wall, said rearwardly located space being divided longitudinally of the body into a cargo-carrying space and a power plant compartment; a power plant in said power plant compartment drivingly connected to certain of the wheels; said power plant compartment including portions of one of the side walls and the rear wall, and having a top cover element substantially normal to said one side wall extending substantially the length of said cargo-carrying space and being vertically spaced from said roof element; and a second cargo-carrying space being defined by said top cover element and portions of said one side wall and roof element.

2. A motor vehicle comprising a longitudinal body carried on front and rear wheels, said body having a floor structure, roof element, side walls, forward wall structure, and rear wall, said floor structure being divided generally transversely thereof into a forwardly located cargo-carrying space, an intermediate operator's station, and a rearwardly located space extending from said operator's station to said rear wall, said rearwardly located space being divided longitudinally of the body into a second cargo-carrying space and a power plant compartment; a power plant in the power plant compartment drivingly connected to certain of the wheels; said power plant compartment including portions of one of the side walls, the rear wall, and a top cover element vertically spaced from said roof element; and a third cargo-carrying space being defined vertically by said top cover element and said roof element and longitudinally by said operator's station and said rear wall.

3. A motor vehicle comprising a longitudinal body carried on front and rear wheels and provided with a front floor area and a rear floor area, one floor area being disposed at a height only a single short step above the ground and providing a cargo-carrying space; means providing an operator's station on the lower floor area forwardly of said rear floor area; means dividing said rear floor area longitudinally of the body into a second cargo-carrying space and a power plant space, said power plant space being defined by a housing enclosed within the body having a substantially horizontally disposed top cover element extending substantially the length of said second cargo-carrying space, said top cover element defining the bottom of a third cargo-carrying space; and a power plant in the housing drivingly connected to certain of the wheels.

CHARLES L. CARLSON.
RAYMOND W. BOND.

REFERENCES CITED

The following references are of record in the file of this patent:

UNITED STATES PATENTS

| Number | Name | Date |
|---|---|---|
| 1,727,721 | Langlands et al. | Sept. 10, 1929 |
| 2,074,484 | Meehan | Mar. 23, 1937 |
| 2,116,666 | Carlson | May 10, 1938 |
| 2,118,810 | Fageol | May 31, 1938 |
| 2,124,166 | Mallett | July 19, 1938 |
| 2,128,930 | Fageol et al. | Sept. 6, 1938 |
| 2,195,509 | Buckendale | Apr. 2, 1940 |
| 2,219,601 | Quartullo | Oct. 29, 1940 |
| 2,353,266 | Reid | July 11, 1944 |
| 2,390,218 | Lamb et al. | Dec. 4, 1945 |

FOREIGN PATENTS

| Number | Country | Date |
|---|---|---|
| 453,062 | Great Britain | Sept. 4, 1936 |
| 192,952 | Switzerland | Dec. 1, 1937 |
| 508,942 | Great Britain | June 30, 1939 |